May 6, 1941.  W. W. LOWTHER  2,240,851
BACKFIRE OIL TRAP
Filed Feb. 10, 1940
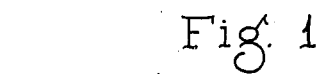
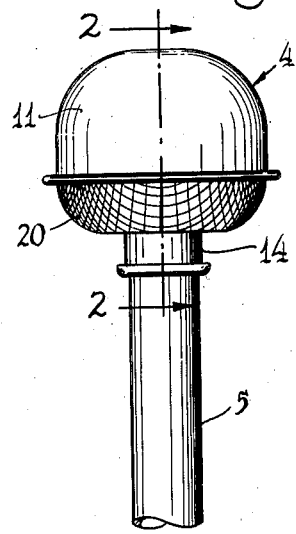
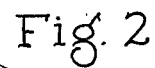
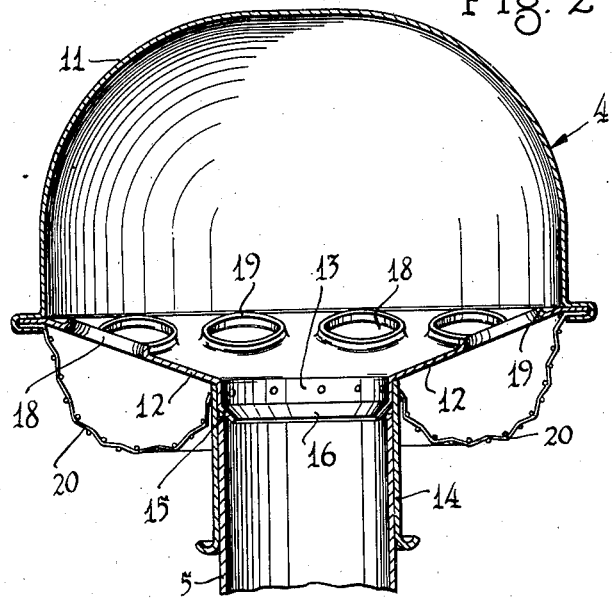
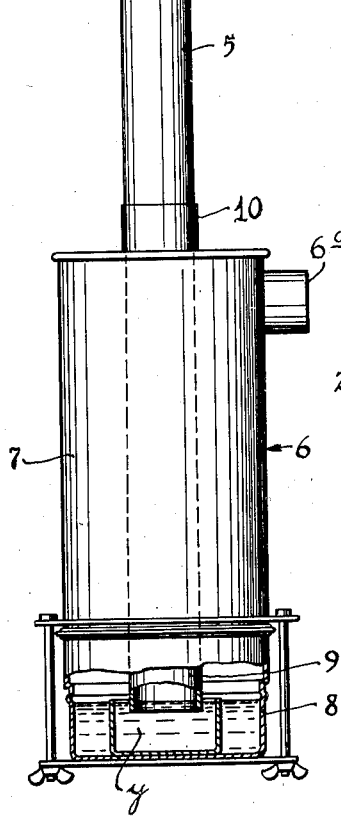
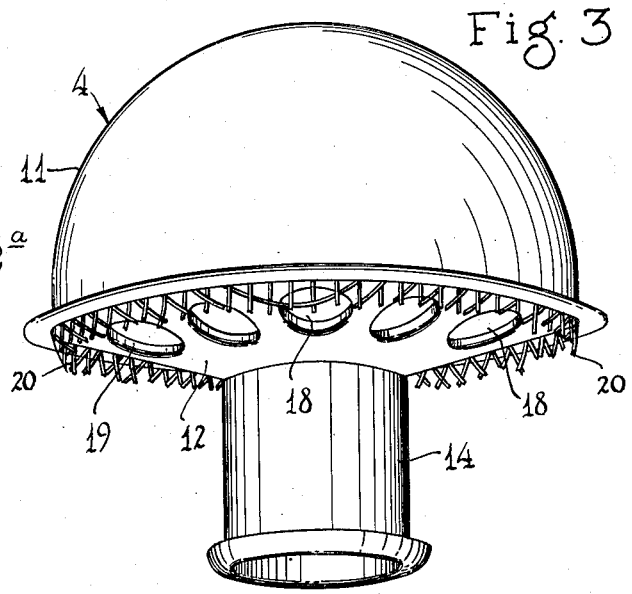
INVENTOR
WILFRED W. LOWTHER
BY HIS ATTORNEYS
Merchant & Merchant Patented May 6, 1941

2,240,851

UNITED STATES PATENT OFFICE 2,240,851

BACKFIRE OIL TRAP

Wilfred W. Lowther, St. Paul, Minn., assignor, by mesne assignments, of twenty-five per cent to Ruth C. Donaldson, twenty per cent to Robert H. Donaldson, twelve and one-half per cent to A. Donaldson Olin, six and one-fourth per cent to Mae D. Buckeye, six and one-fourth per cent to Ralph A. Buckeye, twenty-five per cent to Ruth C. Donaldson as trustee and five per cent to Margaret M. Donaldson Application February 10, 1940, Serial No. 318,338

2 Claims. (Cl. 183—93)

My present invention relates to backfire oil traps for internal combustion engines, and more particularly to devices of this character, which are adapted to be mounted on the upper ends of upwardly projecting air-intake stacks of engines such as used in tractors and the like, and which devices, when so mounted, will function also as rain caps to prevent rain, snow, and the like, from entering the engine's intake through the open upper end of its upwardly projecting air-intake stack. The devices of the invention may therefore be properly referred to as combination rain caps and backfire oil traps for internal combustion engines.

As is well known, internal combustion engines occasionally backfire through their air intakes, and this backfiring, in engines equipped with air cleaners of the fluid body-containing type interposed in their intakes, causes the outward projection through the intake conduit of fluid from the air cleaner. Since air cleaners of this type depend for their efficiency on the maintaining of a substantially constant fluid level, this outward projection and discharging of such fluid through the intake under occasional conditions of backfiring, creates a serious problem, unless some efficient means is provided for intercepting this outwardly projected fluid, before it reaches atmosphere outside of the intake conduit, and leading the same to the intake conduit and air cleaner. Numerous devices have hitherto been developed for this purpose, but most thereof are not suitable for use on extreme upper ends of air intake stacks where it is necessary that they function both as fluid intercepting traps and rain caps to prevent precipitation from entering the engine by way of the air intake stack. In this connection, it may be stated that it is common practice in the tractor industry to provide the intake end of the air cleaner with a vertically extended intake stack, which rises to a level above, where dust is less dense than at ground or engine level, so that the air delivered to the air cleaner carries materially less dust than would be the case were the inlet to the air cleaner made at engine or air cleaner level. In arrangements of this kind, it is obviously impractical to leave the upwardly projected end portion of the air-intake stack open, and hence it has been common practice for years to equip the upper ends of such stacks with rain caps, or other devices, for protection against precipitation.

The device of the present invention provides very effective protection against precipitation, provides a very efficient oil intercepting device or trap, and can be produced without additional cost over and above devices which hitherto have served merely as rain caps for such stacks.

The above and other highly important objects and advantages of the invention will be made apparent from the following specification and claims, and the appended drawing. In the accompanying drawing, like characters indicate like parts throughout the several views.

Referring to the drawing:

Fig. 1 is a small scale view illustrating a device of the invention applied to the upper end of an air-intake stack of an air cleaner;

Fig. 2 is a sectional view taken on a line 2—2 of Fig. 1; and

Fig. 3 is a side and bottom perspective view of the device shown in Fig. 2.

In Fig. 1 a preferred embodiment of the invention indicated as an entirety by 4, is shown as applied to the upper end of a vertically disposed air-intake stack or conduit 5, of a fluid body-containing air cleaner 6. This air cleaner 6 is of the general character disclosed in my prior patent, No. 2,069,889, of February 9, 1939. This air cleaner 6 comprises, in part, a vertically disposed cylindrical casing shell 7 that is primarily open at its lower end, but which is normally closed by a cup-like oil well 8 that is telescopically applied to the lower end thereof. The top of the casing 7 is closed except at its axis, and air is taken into the casing through an axial air inlet tube 9 that extends through the top of the casing and terminates with its lower end below the level of fluid $y$ in the well 8. In air cleaners of this character, the fluid $y$ is usually oil of the character used in engine crank cases. The tubular air-intake stack 5 forms an upwardly extending continuation of the axial air inlet tube 9 and is suitably coupled to the projected upper end of the latter by a suitable coupling sleeve 10, or the like.

A combination rain cap and oil trap 4 comprising a more or less dome-shaped upper shell section 11 that is primarily open at its bottom;

plate-like bottom shell section 12 extending across the bottom portion of the shell section 11 and securely anchored at its periphery to the lower edge of the shell section 11. The bottom shell section 12 may be secured to the upper shell section in any desired manner, as illustrated, and preferably this is accomplished by rolling the lower edge of the upper shell section to form a channel for receiving and tightly embracing the edge of the lower section. The bottom shell section 12 is provided with an axial outlet passage 13 extending downwardly from which is a tubular coupling sleeve 14. This coupling sleeve 14 is rigidly anchored to a downwardly extending annular coupling flange 15 that is integrally formed with the bottom shell section 12.

In preferred practice, the tubular coupling sleeve 14 is telescopically applied over and spot welded to the annular coupling flange 15. The lower end of the flange 15 is contracted to provide a stop shoulder 16. The oil trap 4 is applied to the upper end of the stack 5 by telescopically applying tubular coupling sleeve 14 over the upper end of the stack 5 to the maximum permitted by shoulder 16.

Air is taken in to the interior of the casing through a circumferentially spaced series of air intake openings or passages 18 in the lower casing section 12. These circumferentially spaced air intake passages in the annular lower member 12 are preferably spaced quite materially apart from the air outlet passage 13 and the lower peripheral portion of the upper casing or shell section 11.

Preferably, and as herein illustrated, the lower shell section 12 is concave and tapers downwardly and inwardly from its peripheral portion toward the outlet passage 13. Otherwise stated, the bottom section or member 12, converges downwardly from its peripheral portion to the axial outlet passage 13.

For a purpose that will hereinafter be made clear, those portions of the bottom shell member 12 immediately surrounding the air inlet passages 18, are pressed upwardly to provide annular fluid directing baffles or dams 19, which raise the upper extremities of the inlet passages 18 well above the sloping bottom of the casing or shell.

For the purpose of keeping coarse foreign substances such as chaff, straw, and the like, from entering the air cleaner intake and air cleaner, the oil trap and cap is provided with a downwardly bulged annular screen 20, of woven wire. At its outer edge, this screen is secured in the channel of the upper shell section in common with the peripheral portion of the lower shell section. The annular inner edge of this screen frictionally embraces the tubular coupling sleeve 14.

Under normal engine operating condition, air enters the interior of the trap 4 in an upwardly direction through the several inlet passages 18, reverses its direction of travel within the shell or casing of the trap, and passes outwardly therefrom through the axial air outlet passage 13. From this point, the air continues its downward travel through the stack 5 and the axial tube 9 of the air cleaner 6, and is discharged into the oil well 8. The air then impinges against oil $y$ in the well and reverses its direction of travel over the surface thereof, and passes upwardly through the annular outer portion of the interior of the casing 6 and out through the outlet tube 6a of the air cleaner, from which point it is delivered to the combustion chambers of the engine often through the medium of an interposed carburetor which is not shown. Under normal operation such dust and foreign substance as is carried into the intake of the air cleaner 6 will largely be deposited in the oil $y$ of the air cleaner.

Whenever an engine backfires through its intake, a momentary relative very high pressure is built up in the intake causing a high velocity surge of air movement outwardly through the engine's intake to atmosphere. Such an outwardly moving column of air causes a displacement of oil in the well of the air cleaner outwardly through the air cleaner's intake and through the air stack 5. Under these conditions, oil projected upwardly through the air-intake stack 5 will impinge upon the top inside portion of the shell section 11 and from thence it will flow down the wall of the shell section 11 to the peripheral portion of the lower shell section 12. From this point the oil will flow downwardly and inwardly over the inclined surface of the bottom member 12 to the air intake opening 13, from which point it will drain back into the oil well of the air cleaner. Of course this returning of the oil is made easy by reason of the fact that the outward movement of air is for a very brief instant so that the reverse flowing of oil meets with substantially no resistance. Of course, the dam-acting annular baffles 19 surrounding the air inlet passages 18 will direct the oil flowing over the surface of the inclined bottom 12 around the said inlet passages 18.

From the above, it will be seen that under instantaneous backfire conditions the oil discharged from the air cleaner upwardly through the air-intake stack 5 will be intercepted and returned to the air cleaner substantially without any loss of oil, thereby restoring the oil level in the cleaner and preventing dirtying up or damage to machinery or persons in the vicinity of the device.

I claim:

1. The combination with a vertically disposed section of an engine's air intake conduit, of a backfire oil trap mounted on the intake end of said vertically disposed conduit section, said backfire oil trap comprising a dome-like casing disposed on a vertical axis, the top of said casing being closed and the bottom thereof being provided with an axial air outlet passage, said bottom flaring outwardly and upwardly from the said axial air inlet passage therein to the casing wall, said intake conduit being in communication with the interior of the said casing through said axial air inlet passage but terminating with its upper end below the top of said axial air outlet passage, and a circumferentially spaced series of air inlet ports in said flaring bottom, radially outwardly of said axial outlet passage, those portions of the bottom of the casing immediately surrounding each of the several inlet passages being raised to direct oil flowing over the bottom of the casing around said inlet passages, whereby all of the oil deposited on the bottom of the casing will be returned to the interior of the engine's air intake conduit.

2. A backfire oil trap for engine intakes comprising a dome-like casing disposed on a vertical axis and having a bottom that slopes downwardly and inwardly from its outer edges toward its center, said downwardly and inwardly converging bottom being provided at its approximate center with an air and oil outlet passage that opens downwardly from the lowest portion of the interior of said bottom, said downwardly and inwardly converging bottom being provided with a circumferentially spaced plurality of air inlet openings radially outwardly of the said central air and oil outlet passage, and an upstanding marginal baffle closely associated with each of the several air inlet openings for directing oil flowing over the bottom of the casing around said inlet passages, whereby all of the oil deposited on the downwardly and inwardly converging bottom thereof will drain back through the said central air inlet passage.

WILFRED W. LOWTHER.